US010271294B2

(12) United States Patent
Yamada (10) Patent No.: US 10,271,294 B2
(45) Date of Patent: Apr. 23, 2019

(54) WIRELESS COMMUNICATION DEVICE, WIRELESS COMMUNICATION METHOD, AND STORAGE MEDIUM

(71) Applicant: CASIO COMPUTER CO., LTD., Tokyo (JP)

(72) Inventor: Shunsuke Yamada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 501 days.

(21) Appl. No.: 15/015,876

(22) Filed: Feb. 4, 2016

(65) Prior Publication Data

US 2016/0286511 A1    Sep. 29, 2016

(30) Foreign Application Priority Data

Mar. 23, 2015    (JP) .................................. 2015-059055

(51) Int. Cl.
*H04W 56/00*        (2009.01)
(52) U.S. Cl.
CPC ... *H04W 56/0015* (2013.01); *H04W 56/0035* (2013.01); *H04W 56/0045* (2013.01)
(58) Field of Classification Search
CPC ......... H04W 56/0015; H04W 56/0035; H04W 56/0045
See application file for complete search history.

(56) References Cited

U.S. PATENT DOCUMENTS

2013/0040574 A1\* 2/2013 Hillyard ................ H04W 8/005
455/41.2

2014/0355582 A1\* 12/2014 Kamath ................ H04W 84/20
370/338

(Continued)

FOREIGN PATENT DOCUMENTS

JP    H7-184276 A    7/1995
JP    2007-53628 A    3/2007

(Continued)

OTHER PUBLICATIONS

Japanese Office Action dated May 23, 2017, in a counterpart Japanese patent application No. 2015-059055. (A machine translation (not reviewed for accuracy) attached.).

*Primary Examiner* — Melvin C Marcelo
(74) *Attorney, Agent, or Firm* — Chen Yoshimura LLP (57) ABSTRACT

A wireless communication device includes: a wireless communication module configured to receive a plurality of notification signals that are successively transmitted from another wireless communication device; and a processor that is connected to the wireless communication module, the processor calculating a clock error between a clock in the wireless communication device and a clock in the other wireless communication device based on one or more of the notification signals that are received, and determining a timing at which to make the wireless communication module ready to receive a next notification signal from the other wireless communication device in accordance with the calculated clock error and a time interval at which the next notification signal will be transmitted from the other wireless communication device, the time interval being a predetermined fixed time interval or contained in the notification signal that has been received immediately prior to the next notification signal.

14 Claims, 7 Drawing Sheets

(56) References Cited

U.S. PATENT DOCUMENTS

| | | |
|---|---|---|
| 2015/0109978 A1 | 4/2015 | Berntsen et al. |
| 2016/0278011 A1 | 9/2016 | Tomida |
| 2017/0134925 A1* | 5/2017 | Keranen ............... H04W 8/005 |
| 2017/0343965 A1* | 11/2017 | Kyou ..................... G04B 19/22 |
| 2018/0007228 A1* | 1/2018 | Suzuki ................... H04W 4/80 |
| 2018/0017946 A1* | 1/2018 | Kyou ..................... H04W 4/80 |

FOREIGN PATENT DOCUMENTS

| | | |
|---|---|---|
| JP | 2010-28503 A | 2/2010 |
| JP | 2014-115794 A | 6/2014 |
| JP | 2014-526821 A | 10/2014 |
| JP | 2015-8368 A | 1/2015 |

* cited by examiner

WIRELESS COMMUNICATION DEVICE, WIRELESS COMMUNICATION METHOD, AND STORAGE MEDIUM

BACKGROUND OF THE INVENTION

Technical Field

The present invention relates to a wireless communication device, a wireless communication method, and a storage medium.

Background Art

In recent years, the reduced power consumption short-range wireless communication standard Bluetooth (registered trademark) low energy (BLE) has become more widely used.

Many wireless communication devices that utilize BLE for wireless communication are battery-powered. Such applications demand reductions in inefficient power consumption.

One method for reducing the power consumption associated with wireless communications is to perform the wireless communications intermittently. In this case, the longer the idle period (the period of time during intermittent communication during which no connection is made), the greater the extent to which power consumption can be reduced.

However, during these idle periods, clock signals cannot be synchronized between the wireless communication devices. As a result, the longer the idle period becomes, the greater the difference in the clock signals (the clock error) between the wireless communication devices becomes.

Each wireless communication device keeps track of the timing for communications in accordance with the local clock signal. Therefore, as the clock error between the wireless communication devices increases, the timings at which communication takes place after the idle period become increasingly desynchronized. In this case, the frequency of communications or the scanning time on the receiving side must be increased in order to communicate reliably. This increases the length of the period of time during which the wireless communication devices are actively operating, thereby increasing power consumption.

To solve this problem, there are methods that allow each wireless communication device to calculate the time difference between a local reference timer and a timer on another wireless communication device (the communication partner).

In Japanese Patent Application Laid-Open Publication No. 2014-115794, for example, a master node and a slave node each get the send times or the receive times for communication packets and then calculate the differences between those times. These time differences can be used to correct the clock error.

In the above document, the time differences are only calculated when communication packets are sent or received. As a result, even if the clock error is corrected using a given time difference, the clock error between the wireless communication devices can only be corrected for the time at which the corresponding communication packet was sent or received.

Therefore, during the idle period the clock error between the wireless communication devices cannot be corrected, and that clock error between the wireless communication devices continues to increase as time elapses. As described above, in this case the timings at which communication occurs after the idle period become increasingly desynchronized. This makes it necessary to increase the length of the period of time during which the wireless communication devices are actively operating, thereby increasing power consumption.

SUMMARY OF THE INVENTION

The present invention aims to provide a wireless communication device or the like that makes it possible to keep communication timing synchronized with another wireless communication device while reducing inefficient power consumption. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a wireless communication device, including: a wireless communication module configured to receive a plurality of notification signals that are successively transmitted from another wireless communication device; and a processor that is connected to the wireless communication module, the processor calculating a clock error between a clock in the wireless communication device and a clock in the other wireless communication device based on one or more of the notification signals that are received, and determining a timing at which to make the wireless communication module ready to receive a next notification signal from the other wireless communication device in accordance with the calculated clock error and a time interval at which the next notification signal will be transmitted from the other wireless communication device, the time interval being a predetermined fixed time interval or contained in the notification signal that has been received immediately prior to the next notification signal.

Furthermore, in another aspect, the present disclosure provides: a wireless communication device, including: a communication module that communicates with another wireless communication device; and a processor connected to the communication module, the processor generating notification signals respectively including transmission count or time information, and causing the notification signals to be transmitted from the communication module successively a plurality of times at prescribed intervals.

In another aspect, the present disclosure provides a wireless communication method for execution at a wireless communication device, including: receiving, via a wireless communication module included in the wireless communication device, a plurality of notification signals that are successively transmitted from another wireless communication device; calculating, by a processor included in the wireless communication device, a clock error between a clock in the wireless communication device and a clock in the other wireless communication device based on one or more of the notification signals that are received; and determining, by the processor, a timing at which to make the wireless communication module ready to receive a next notification signal from the other wireless communication device in accordance with the calculated clock error and a time interval at which the next notification signal will be transmitted from the other wireless communication device, the time interval being a predetermined fixed time interval or contained in the notification signal that has been received immediately prior to the next notification signal.

Furthermore, in another aspect, the present disclosure provides a wireless communication method for execution by a wireless communication device, including: generating, via a processor included in the wireless communication device, notification signals respectively including transmission count or time information; and transmitting, via a communication module included in the wireless communication device, the generated notification signals to another wireless communication device successively a plurality of times at prescribed intervals.

In another aspect, the present disclosure provides a non-transitory storage medium having stored therein instructions that cause a processor included in a wireless communication device to perform the following: causing a wireless communication module included in the wireless communication device to receive a plurality of notification signals that are successively transmitted from another wireless communication device; calculating a clock error between a clock in the wireless communication device and a clock in the other wireless communication device based on one or more of the notification signals that are received; and determining a timing at which to make the wireless communication module ready to receive a next notification signal from the other wireless communication device in accordance with the calculated clock error and a time interval at which the next notification signal will be transmitted from the other wireless communication device, the time interval being a predetermined fixed time interval or contained in the notification signal that has been received immediately prior to the next notification signal.

Furthermore, in another aspect, the present disclosure provides a non-transitory storage medium having stored therein instructions that cause a processor included in a wireless communication device to perform the following: generating notification signals respectively indicating transmission count or time information; and causing a communication module included in the wireless communication device to transmit the notification signals to another wireless communication device successively a plurality of times at prescribed intervals.

It is to be understood that both the foregoing general description and the following detailed description are exemplary and explanatory, and are intended to provide further explanation of the invention as claimed.

BRIEF DESCRIPTION OF THE DRAWINGS

FIGS. 7A and 7B conceptually illustrate examples of cumulatively evaluating clock error.

DETAILED DESCRIPTION OF EMBODIMENTS

Embodiments

Figure 1:
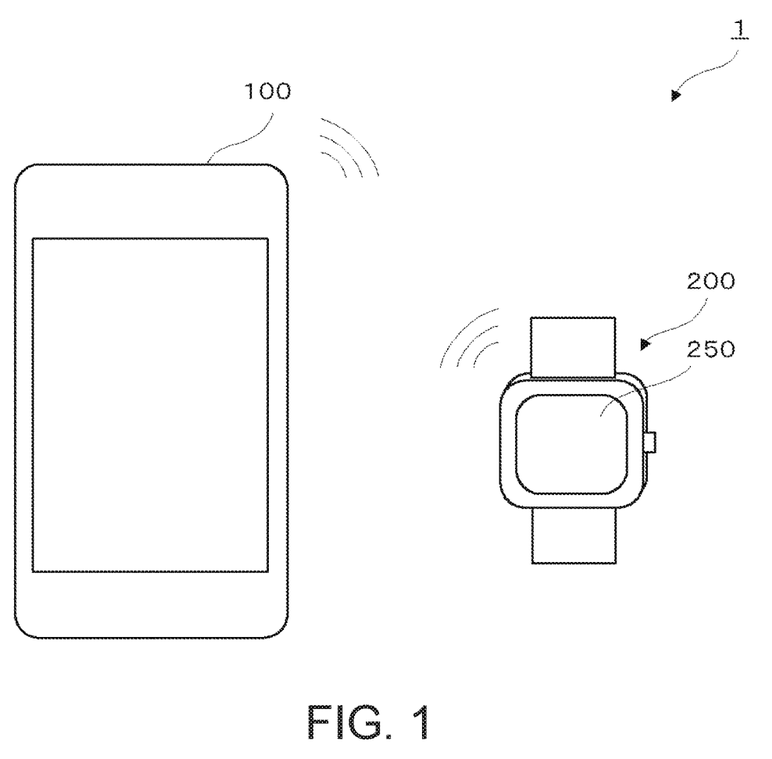
FIG. 1 illustrates an example configuration of a wireless communication system in accordance with an embodiment.

Next, an embodiment of the present invention will be described with reference to figures. As illustrated in FIG. 1, a wireless communication system 1 in accordance with the embodiment of the present invention includes a central device 100 (a wireless communication device) and a peripheral device 200 (another wireless communication device different from the central device 100).

The central device 100 and the peripheral device 200 communicate wirelessly with one another using Bluetooth (registered trademark) low energy (BLE). BLE is a reduced power consumption mode of the short-range wireless communication standard Bluetooth (registered trademark).

Here, the central device 100 provides a service to the peripheral device 200. The peripheral device 200 uses the service provided by the central device 100.

The central device 100 and peripheral device 200 are portable devices that support BLE wireless communication, such as mobile phones, smartphones, tablet-style personal computers, notebook-style personal computers, or watches, for example.

In the present embodiment, the central device 100 is a smartphone, and the peripheral device 200 is a smartwatch that receives data from the central device 100 and displays that data on a display module 250, for example.

Figure 2:
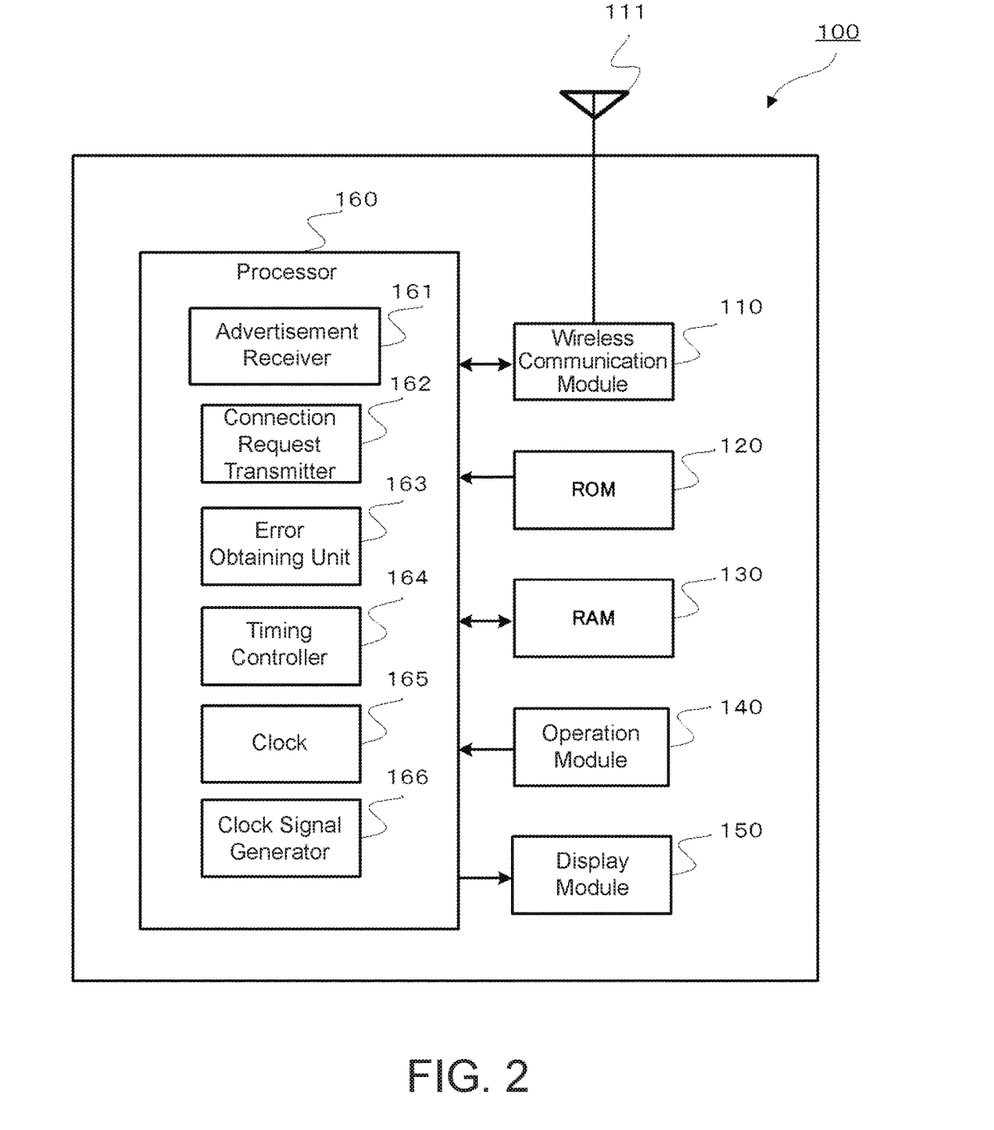
FIG. 2 is a block diagram illustrating an example configuration of a central device in accordance with the embodiment.

Next, the configuration of the central device 100 of the present embodiment will be described. As illustrated in FIG. 2, the central device 100 includes a wireless communication module 110, a read-only memory (ROM) 120, a random-access memory (RAM) 130, operation module 140, a display module 150, and a processor 160.

The wireless communication module 110 includes a radio frequency (RF) circuit, a baseband (BB) circuit, an integrated circuit (LSI), and the like, for example. Strictly speaking, the wireless communication module 110 also includes an RF clock signal generator (not illustrated in the figure). The wireless communication module 110 sends and receives signals via an antenna 111 in order to communicate wirelessly with the peripheral device 200 (the other wireless communication device) using BLE.

The ROM 120 is a non-volatile memory such as a flash memory and stores programs and data that the processor 160 needs to control the various functions of the device. The ROM 120 also stores data such as the timing at which past advertisements were received.

The RAM 130 is a volatile memory and is used as a working region to temporarily store data that the processor 160 needs to execute various processes.

The operation module 140 is constituted by a touch panel and functions as an interface that allows the user to input instructions.

The display module 150 is a display such as a liquid crystal display (LCD) or an electroluminescent (EL) display and displays images in accordance with image data input by the processor 160, for example.

The processor 160 is a central processing unit (CPU), for example. The processor 160 executes programs stored in the ROM 120 (such as a program for implementing a timing control process that will be described later) in order to control the overall behavior of the central device 100.

Next, the functional configuration of the processor 160 of the central device 100 will be described. As illustrated in FIG. 2, the processor 160 includes an advertisement receiver 161, a connection request transmitter 162, an error obtaining unit 163, a timing controller 164, a clock 165, and a clock signal generator 166. The advertisement receiver 161, the connection request transmitter 162, the error obtaining unit 163, the timing controller 164, the clock 165, and the clock signal generator 166 may be implemented as a single processor or as a plurality of separate processors that work together.

The advertisement receiver 161 of the processor 160 receives advertisements sent from the peripheral device 200 in accordance with scan instructions. These scan instructions may be user operations such as launching an application for using a service provided by the central device 100, for example. Note, however, that these scan instructions are not limited to user operations and may be performed automatically after a prescribed period of time after launching an application. Moreover, the advertisement receiver 161 corresponds to a notification signals receiving unit.

The connection request transmitter 162 of the control unit 160 sends a connection request to the peripheral device 200 via the wireless communication module 110 in order to request a connection. This connection request is sent when a connection is required after receiving an advertisement sent from the peripheral device 200.

Cases in which a connection is required include cases in which there is data to be transferred between the devices, for example. There are also cases in which a connection request is sent in accordance with a connection request flag received from the peripheral device 200 (described later). More specifically, when the received connection request flag indicates that a connection has been requested, the connection request transmitter 162 sends a connection request. When the received connection request flag indicates that a connection has not been requested, the connection request transmitter 162 only sends a connection request if there is data to be transferred to or from the central device 100. Moreover, the connection request transmitter 162 corresponds to a connection request unit.

The error obtaining unit 163 of the processor 160 calculates the clock error between the central device 100 and the peripheral device 200 in accordance with the advertisements received from the peripheral device 200. There are two methods of calculating the clock error. The first method is to count the numbers of pulses in the clock signals for a given period of time and use those numbers to determine the time error (that is, the phase error) between those clock signals. The other method is to calculate the difference between the clock frequencies to determine the error in clock speed (that is, the clock frequency error) between the clock signals. A specific method for calculating the clock error will be described in more detail later. Moreover, the error obtaining unit 163 corresponds to an error obtaining unit.

The timing controller 164 of the processor 160 controls the timing at which the advertisement receiver 161 activates the communication module in order to receive the next advertisement signal in accordance with the clock error calculated by the error obtaining unit 163.

More specifically, values counted by the clock 165 are controlled to remove phase error in the clock signals, and the clock signal frequency of the clock signal generator 166 is controlled to remove error in the clock signal frequency. Moreover, the timing controller 164 corresponds to a timing controller.

The clock 165 of the processor 160 is a counter circuit that counts the number of pulses in the local clock signal (that is, the clock signal of the central device 100). The processor 160 executes various control processes in accordance with the counted number of pulses. Moreover, the clock 165 corresponds to a clock.

The clock signal generator 166 of the processor 160 generates the local clock signal (for the central device 100) and includes a crystal oscillator that generates a reference clock, a variable PLL that generates a clock signal of a prescribed frequency from the reference clock, and the like. The frequency of the clock signal can be controlled by changing the division ratio of the variable PLL.

The timing at which to activate the communication module in order to receive the next advertisement signal is controlled by controlling the counted values and the clock signal frequency of the clock 165 and the clock signal generator 166 of the processor 160, which are the factors that determine the timing at which to activate the communication module in order to receive the next advertisement signal.

Figure 3:
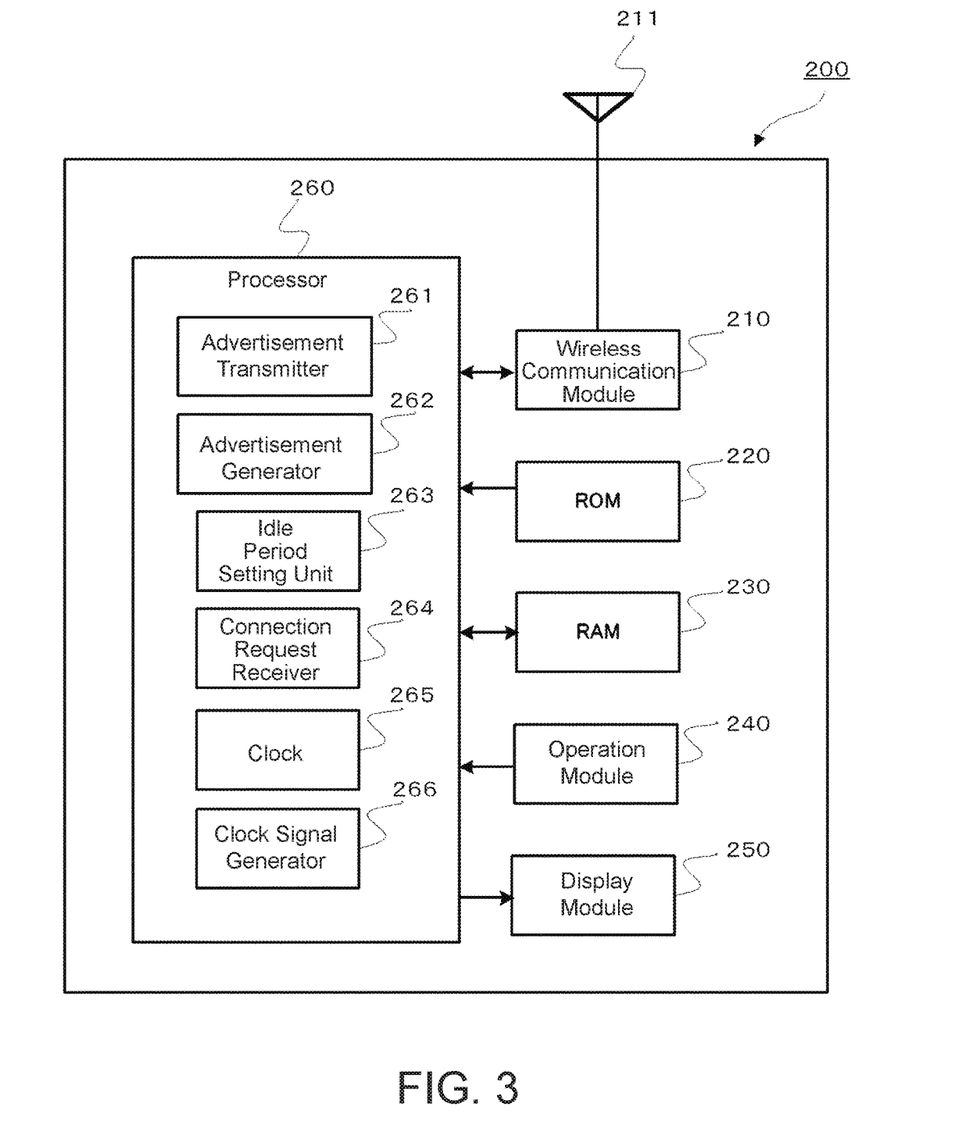
FIG. 3 is a block diagram illustrating an example configuration of a peripheral device in accordance with the embodiment.

Next, the configuration of the peripheral device 200 of the present embodiment will be described. As illustrated in FIG. 3, the peripheral device 200 includes a wireless communication module 210, a ROM 220, a RAM 230, operation module 240, a display module 250, and a processor 260.

The wireless communication module 210 is an RF circuit, a BB circuit, an LSI, or the like, for example. The wireless communication module 210 communicates wirelessly via an antenna 211 with the peripheral device 100 (the other wireless communication device) using BLE.

The ROM 220 is a non-volatile memory such as a flash memory and stores programs and data that the processor 260 needs to control the various functions of the device.

The RAM 230 is a volatile memory and is used as a working region to temporarily store data that the processor 260 needs to execute various processes.

The operation module 240 is constituted by a switch or the like and functions as an interface that accepts operations from the user.

The display module 250 is a display such as an LCD or an EL display and displays images in accordance with image data input by the processor 260, for example.

The processor 260 is a CPU, for example. The processor 260 executes programs stored in the ROM 220 (such as a program for implementing a timing control process that will be described later) in order to control the overall behavior of the peripheral device 200.

Next, the functional configuration of the processor 260 of the peripheral device 200 will be described. As illustrated in FIG. 3, the processor 260 includes an advertisement transmitter 261, an advertisement generator 262, an idle period setting unit 263, a connection request receiver 264, a clock 265, and a clock signal generator 266. The advertisement transmitter 261, the advertisement generator 262, the idle period setting unit 263, the connection request receiver 264, the clock 265, and the clock signal generator 266 may be implemented as a single processor or as a plurality of separate processors that work together.

The advertisement transmitter 261 of the processor 260 sends a plurality of advertisements at fixed intervals and performs the sending process intermittently. Moreover, the advertisement transmitter 261 corresponds to a notification signals transmission unit.

The advertisement generator 262 of the processor 260 generates advertisements that contain various information. In the present embodiment, this information includes transmission count information that indicates during which sending processes the advertisement was sent and idle period information that indicates the interval between intermittently sent advertisements.

Moreover, the advertisement generator 262 of the control unit 260 also generates advertisements that contain a connection request flag in addition to the various types of information described above. This connection request flag indicates whether to request connection with the central device 100. Moreover, the advertisement generator 262 corresponds to a notification signals generating unit.

The idle period setting unit 263 of the processor 260 sets the idle period, which is part of the interval when the advertisement transmitter 261 of the processor 260 intermittently sends advertisements. The idle period is calculated in accordance with the periods of time during which data does not need to be transferred between the central device 100 and the peripheral device 200.

The periods of time during which data does not need to be transferred are defined by a sending interval at which the central device 100 sends data to the peripheral device 200, for example. This sending interval may be constant or may be variable and be updated as appropriate to decrease the sending interval when there are significant changes in the data from the central device 100 and to increase the sending interval when there are fewer changes in the data from the central device 100, for example.

The connection request receiver 264 of the processor 260 receives connection requests from the central device 100 and establishes a connection between the central device 100 and the peripheral device 200. Establishing this connection makes it possible to transfer data between the central device 100 and the peripheral device 200.

The clock 265 of the processor 260 is a counter circuit that counts the number of pulses in the local clock signal (that is, the clock signal of the peripheral device 200). The processor 260 executes various control processes in accordance with the counted number of pulses. For example, the advertisement transmitter 261 of the processor 260 sends advertisements in accordance with the number of pulses counted. Moreover, the clock 265 corresponds to a clock.

The clock signal generator 266 of the processor 260 generates the local clock signal (for the peripheral device 200) and includes a crystal oscillator that generates a reference clock, a variable PLL that generates a clock signal of a prescribed frequency from the reference clock, and the like. The frequency of the clock signal can be controlled by changing the division ratio of the variable PLL.

Next, the process by which advertisements are intermittently sent and received between the central device 100 and the peripheral device 200 will be described with reference to FIGS. 4 and 5. The advertisements are sent and received over a single channel (channel 1). First, the peripheral device 200 intermittently sends a group of advertisements that includes a plurality of advertisements sent at fixed intervals (step S10). Here, "advertisement" refers to notification signals that notify a user of the existence of that information.

The idle period is a period of time set for each group of advertisements by the idle period setting unit 263 of the processor 260 of the peripheral device 200 and defines the period of time between when the last advertisement of one group of advertisements and the first advertisement of the next group of advertisements are sent. In the example illustrated in FIG. 4, for example, the idle period between the first and second groups of advertisements (for which N=1 and N=2) is set to T1 seconds, and the idle period between the second and third groups of advertisements (for which N=2 and N=3) is set to T2 seconds.

Furthermore, for the last advertisement of a group of advertisements, the advertisement generator 262 of the processor 260 of the peripheral device 200 generates an advertisement that includes idle period information that indicates the idle period until the next group of advertisements should be sent.

Figure 4:
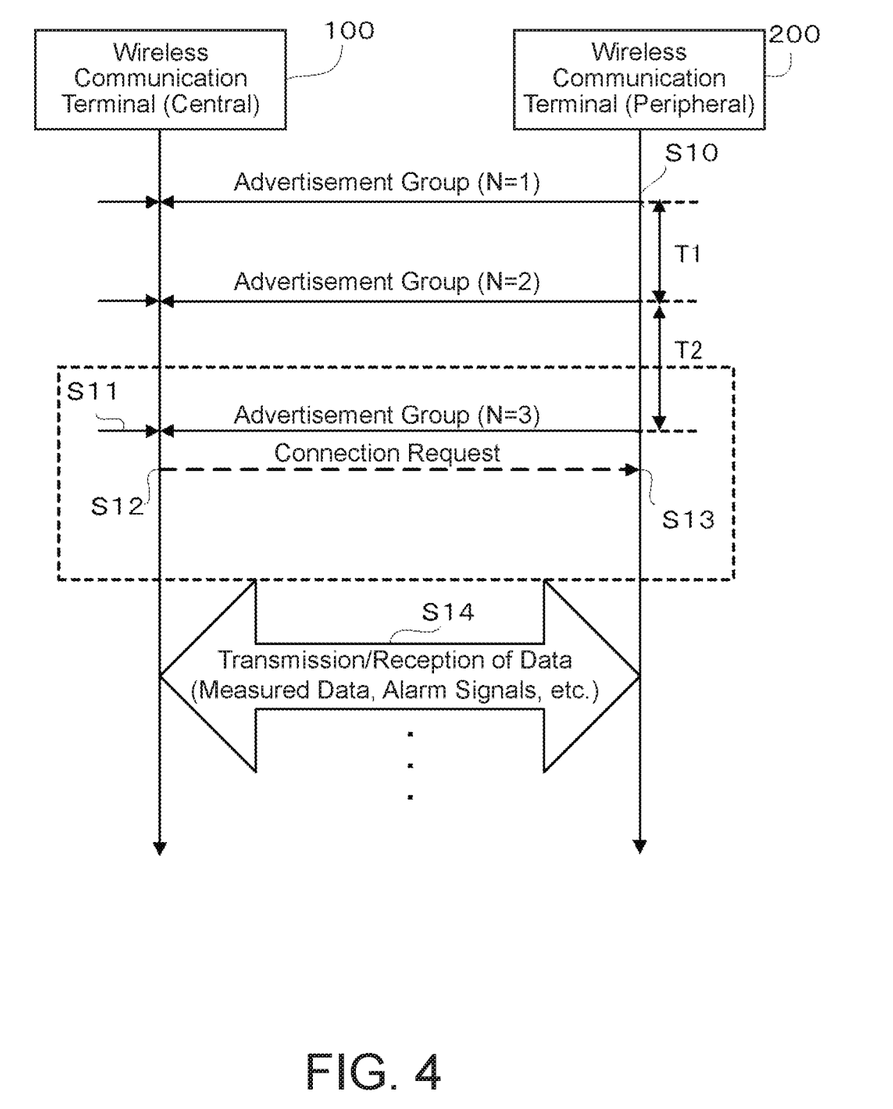
FIG. 4 is a sequence diagram illustrating an example of an intermittent advertisement communication operation between the central device and the peripheral device in accordance with the embodiment.

In the example illustrated in FIG. 4, the peripheral device 200 sends three groups of advertisements (N=1 to N=3). Normally, in the first group of advertisements, n advertisements are sent (where n is any natural number and may be set individually for each group of advertisements).

However, if the peripheral device 200 receives a connection request while sending the nth advertisement in a group of advertisements, no further advertisements from that group of advertisements are sent. For a group of advertisements that includes ten advertisements, for example, if a connection request is received while sending the sixth advertisement, the seventh to tenth advertisements are not sent.

Next, the central device 100 scans the channel on the frequency band on which the advertisements are sent and receives any sent advertisements (step S11). When a connection is required, the central device 100 sends a connection request after a prescribed period of time (such as 150 μsec) after a given advertisement is received (step S12).

Furthermore, the central device 100 does not scan during the idle period but runs a scan after each send/receive process while a group of advertisements is being sent.

In the example illustrated in FIG. 4, a connection request is sent when the sixth advertisement in the third group of advertisements (N=3) is sent. Note that for convenience, in FIG. 4 the connection request received by the peripheral device 200 while the third group of advertisements (N=3) is being sent is depicted beneath the third group of advertisements (N=3).

Next, when the peripheral device 200 receives the connection request, a connection with the central device 100 is established (step S13), and the central device 100 transfers prescribed data with the peripheral device 200 (step S14). Once there is no more data that needs to be transferred, a connection termination process is executed to terminate wireless communication.

Figure 5:
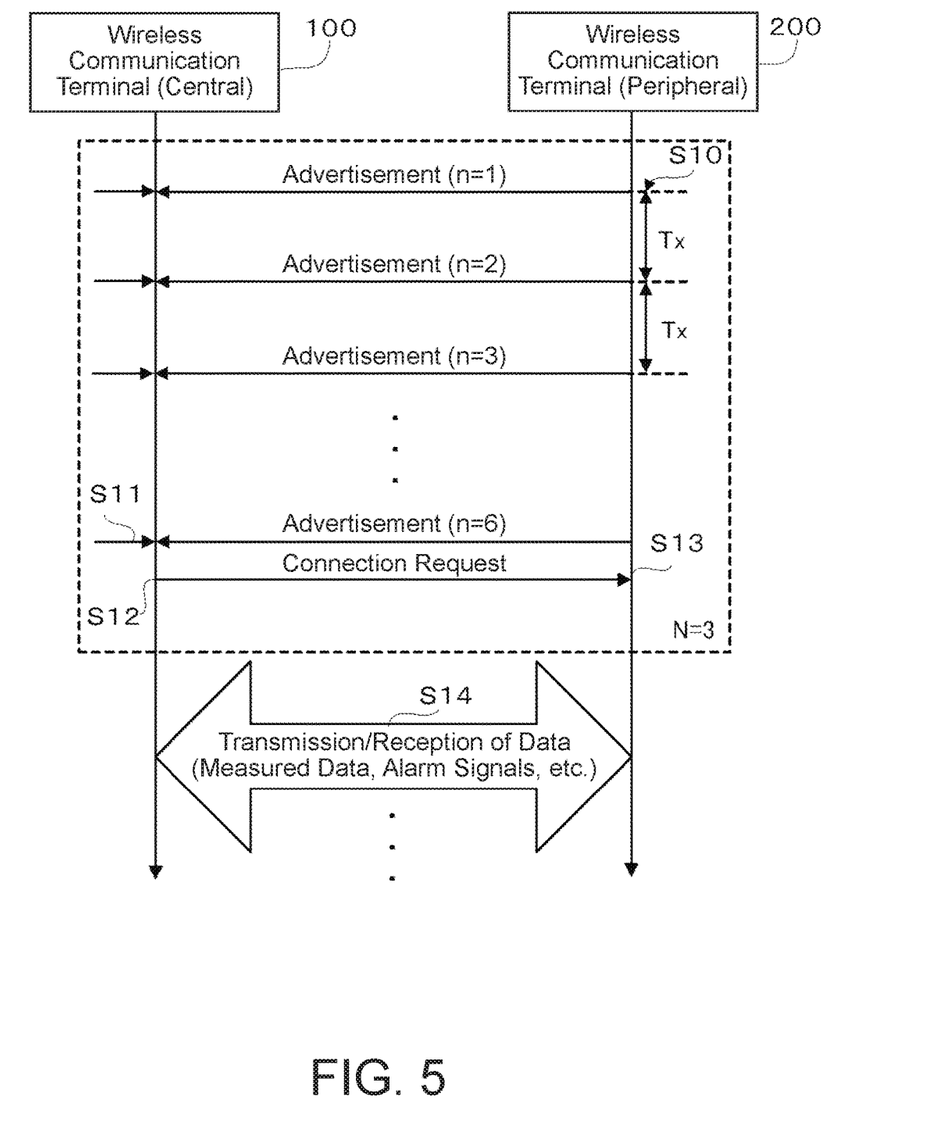
FIG. 5 is a sequence diagram illustrating an example of a fixed-interval advertisement communication operation between the central device and the peripheral device in accordance with the embodiment.

FIG. 5 is a sequence diagram in which the portion enclosed in dashed lines in FIG. 4 is enlarged and illustrated in more detail. In this example, in the third group of advertisements (N=3), six advertisements are sent at a fixed interval Tx. Upon receiving the sixth advertisement (n=6), the central device 100 sends a connection request to the peripheral device 200.

Note that the other groups of advertisements (such as N=1 or N=2) also include n advertisements sent at the fixed interval Tx. Using the fixed interval Tx makes it possible to set a fixed value for that interval in advance as part of the specifications for the central device 100 and the peripheral device 200.

In this way, N groups of advertisements are sent intermittently, and each group of advertisements includes n advertisements sent at fixed intervals. Each advertisement contains transmission count information (such as N=2 and n=4) that indicates during which sending processes the advertisement was sent. The advertisement generator 262 of the processor 260 of the peripheral device 200 includes this transmission count information in each advertisement that is generated.

Figure 6:
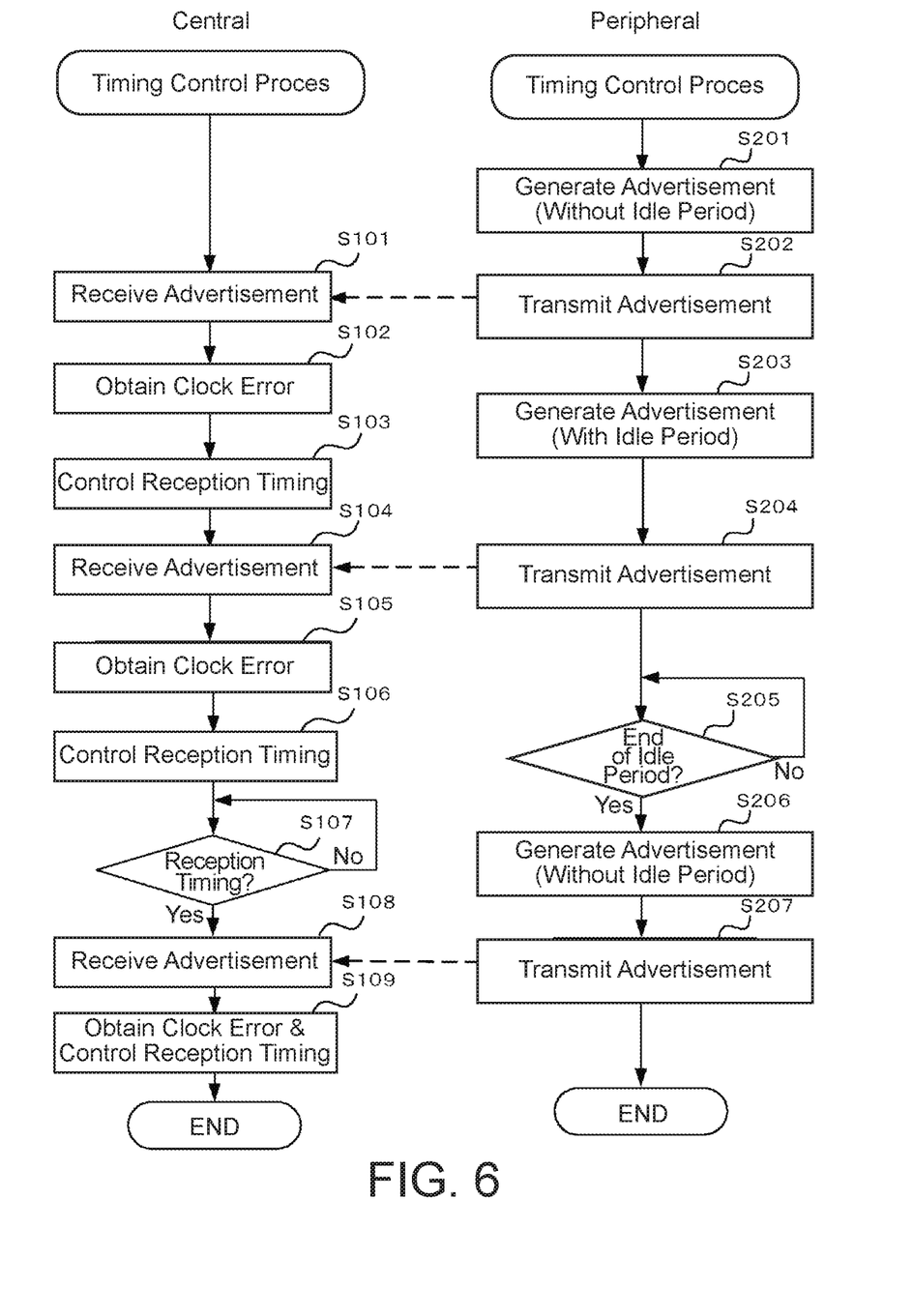
FIG. 6 is a flowchart illustrating examples of timing control processes for controlling the timing at which to activate the communication module in order to receive the next advertisement signal.

Next, a timing control process for the central device 100 that receives these advertisements will be described. FIG. 6 is a flowchart illustrating a simple example of the scheme described above. For simplicity, in this example only the timing control processes will be described, and the details of the connection request flag will not be described.

FIG. 6 illustrates examples of the timing control processes for a case in which the central device 100 has received two advertisements before the idle period and one advertisement after the idle period. Assume that the sending indices for the two advertisements received before the idle period are N=1, n=1 and N=1, n=2 and that these advertisements were sent at a fixed interval Tx (such as 1 second). Moreover, let the sending indices for the advertisement received after the idle period be N=2, n=1, and let the idle period between when the N=1, n=2 advertisement and the N=2, n=1 advertisement were sent be T1 (30 seconds, for example).

Note that the advertisements may contain a large variety of types of information and may be sent in a large variety of sending orders. Therefore, the actual timing control processes are not limited to those illustrated in the flowchart in FIG. 6.

The timing control processes are started when some trigger occurs. Examples of triggers include turning on the central device 100 or the peripheral device 200 or the user inputting an instruction that executes a program that starts the timing control processes.

First, the advertisement generator 262 of the processor 260 of the peripheral device 200 generates an advertisement that contains transmission count information such as N=2, n=3 (step S201). Next, the advertisement transmitter 261 of the peripheral device 200 sends the generated advertisement to the central device 100 (step S202).

Then, the advertisement receiver 161 of the central device 100 receives the advertisement sent from the peripheral device 200 (step S101). Next, the error obtaining unit 163 of the central device 100 calculates the clock error in accordance with the received advertisement in order to obtain the current clock error (step S102).

Next, the method for calculating the clock error will be described. The central device 100 can receive an advertisement during a scanning period (also known as a scanning window). The timing at which an advertisement should be received is set to the center time of this scanning period. In other words, even if the set timing and the timing at which the advertisement is actually received are slightly different, the central device 100 can still receive the advertisement as long as the scanning period is still active.

Assume that the transmission count information for the received advertisement is N=1, n=1, for example. In other words, assume that this is the first advertisement that has been received. In this case, the error obtaining unit 163 of the central device 100 compares the number of pulses that should have been counted by the clock 165 of the processor 160 by the time the advertisement is received to the number of pulses that were actually counted by the clock 165 of the processor 160 when the advertisement was received in order to obtain the current clock error (the difference between these numbers of pulses).

Assume, for example, that the target (estimated) timing at which the advertisement should be received is at pulse number 23 on the clock and that the scanning window lasts from pulse numbers 21 to 25. In this case, if the advertisement is actually received at pulse number 24 on the clock, then the clock error would be equal to 1 pulse.

The timing controller 164 of the processor 160 of the central device 100 controls the timing at which the advertisement receiver 161 of the processor 160 activates the communication module in order to receive the next advertisement signal in accordance with the clock error calculated by the error obtaining unit 163 of the processor 160 (step S103).

If the timing at which the advertisement was actually received is earlier than the timing, the clock speed of the clock signal generated by the clock signal generator 166 of the processor 160 is increased, and a negative offset is added to the number of pulses counted by the clock 165 of the processor 160.

If the timing at which the advertisement was actually received is later than the timing, the clock speed of the clock signal generated by the clock signal generator 166 of the processor 160 is decreased, and a positive offset is added to the number of pulses counted by the clock 165 of the processor 160. In the example described above, the clock error is 1 pulse, so a positive offset of +1 is added, for example.

While the central device 100 is calculating the clock error and controlling the timing at which to activate the communication module in order to receive the next advertisement signal, the advertisement generator 262 of the processor 260 of the peripheral device 200 generates the next advertisement. In this example, the idle period starts after this next advertisement is sent, so an advertisement that contains the transmission count information N=1, n=2 as well as idle period information (where the idle period is T1) is generated (step S203).

Next, the advertisement transmitter 261 of the processor 260 of the peripheral device 200 sends the generated advertisement to the central device 100 (step S204). Once this advertisement is sent, the peripheral device 200 enters an energy-saving state in which no further advertisements are sent until the idle period is over (step S205; No).

Meanwhile, the advertisement receiver 161 of the processor 160 of the central device 100 receives the advertisement sent from the peripheral device 200 (step S104). Next, the error obtaining unit 163 of the central device 100 calculates the clock error in accordance with the received advertisement (step S105).

The received advertisement contains the transmission count information N=1, n=2. In other words, one previous advertisement has been received before this advertisement. In this case, the error obtaining unit 163 of the processor 160 of the central device 100 compares the number of pulses counted by the clock 165 of the processor 160 at the timing when the central device 100 actually received the current (N=1, n=2) advertisement to the number of pulses counted by the clock 165 of the processor 160 at the timing when the central device 100 actually received the previous (N=1, n=1) advertisement plus the number of pulses corresponding to the fixed interval Tx (that is, the timing for the current advertisement) in order to obtain the current clock error (the difference between these numbers of pulses).

Assume that the fixed interval Tx is equal to 5 pulses, for example. Also, assume that the pulse number on the clock 165 of the processor 160 when the N=1, n=1 advertisement was received in step S101 was 5. Finally, assume that the pulse number on the clock 165 of the processor 160 when the N=1, n=2 advertisement was actually received was 9. In this case, the pulse number of the target receive time (5+5=10) is compared to the pulse number when the advertisement was actually received (9), yielding a clock error of 1 pulse. In this case, a positive offset of +1 pulse is added to the number of pulses counted by the clock 165 of the processor 160, and the clock speed of the clock signal generator 166 of the processor 160 is decreased.

In this way, the error obtaining unit 163 of the processor 160 of the central device 100 calculates the clock error in accordance with the fixed interval Tx and the transmission count information included in the received advertisements.

The timing controller 164 of the processor 160 of the central device 100 controls the timing at which the advertisement receiver 161 of the processor 160 activates the communication module in order to receive the next advertisement signal in accordance with the clock error calculated by the error obtaining unit 163 of the processor 160 (step S106). The method for controlling the timing at which to activate the communication module in order to receive the next advertisement signal in accordance with the clock error is the same as in step S103.

Furthermore, the advertisement received most recently also contains the idle period information. Therefore, in addition to controlling the receive time in accordance with the clock error, the timing at which to activate the communication module in order to receive the next advertisement signal is set by adding the number of pulses corresponding to the idle period T1 indicated by the idle period information to the number of pulses that were on the clock 165 of the processor 160 when the last advertisement was actually received.

Once the next receive time has been set, the central device 100 enters a power-saving state in which no further scans for receiving advertisements are performed until the idle period is over (step S107; No).

Once the idle period is over (step S205; Yes), the peripheral device 200 once again generates an advertisement (step S206) and sends that advertisement (step S207). Note that the advertisement generated here includes the transmission count information N=2, n=1.

Meanwhile, the central device 100 exits the power-saving state once the idle period is over (step S107; Yes). Then, the advertisement receiver 161 of the processor 160 of the central device 100 receives the advertisement sent from the peripheral device 200 (step S108).

Next, the error obtaining unit 163 of the processor 160 of the central device 100 calculates the clock error in accordance with the received advertisement. Furthermore, the timing controller 164 of the processor 160 of the central device 100 controls the timing at which the advertisement receiver 161 of the processor 160 activates the communication module in order to receive the next advertisement signal in accordance with the clock error calculated by the error obtaining unit 163 of the processor 160 (step S109).

Here, the received advertisement contains the transmission count information N=2, n=1. In other words, advertisements from before the idle period were received before this advertisement.

In this case, the error obtaining unit 163 of the processor 160 of the central device 100 compares the number of pulses counted by the clock 165 of the processor 160 at the timing when the central device 100 received the current (N=2, n=1) advertisement to the number of pulses counted by the clock 165 of the processor 160 at the timing when the central device 100 actually received the previous (N=1, n=2) advertisement plus the number of pulses corresponding to the idle period T1 (that is, the timing for the current advertisement) in order to obtain the current clock error (the difference between these numbers of pulses). Furthermore, the method for controlling the timing at which to activate the communication module in order to receive the next advertisement signal here is the same as described above.

Assume that the idle period T1 is equal to 25 pulses, for example. Also, assume that the pulse number on the clock 165 when the N=1, n=2 advertisement was received in step S104 was 10 (after adding the offset). Finally, assume that the pulse number on the clock 165 of the processor 160 when the N=2, n=1 advertisement was actually received was 36.

In this case, the pulse number of the target receive time (10+25=35) is compared to the pulse number when the advertisement was actually received (36), yielding a clock error of 1 pulse. In this case, a negative offset of −1 pulse is added to the number of pulses counted by the clock 165 of the processor 160, and the clock speed of the clock signal generator 166 of the processor 160 is increased.

In this way, the error obtaining unit 163 of the processor 160 of the central device 100 calculates the clock error in accordance with the idle period information and the transmission count information included in the received advertisement.

In the example illustrated in FIG. 6, the timing control processes are shown ending after steps S109 and S207. However, the remaining portions of the sequences are merely omitted from the figure for simplicity. In reality, the timing control processes continue after this point in accordance with the information contained in the advertisements.

Next, the omitted portions of the timing control processes that occur immediately after steps S109 and S207 will be described briefly. Assume here that the advertisement to be sent next contains the transmission count information N=2, n=2 but does not contain any idle period information.

In this case, this next advertisement is sent after the fixed interval Tx after the previous N=2, n=1 advertisement was received. Therefore, the central device 100 calculates the clock error and controls the timing at which to activate the communication module in order to receive the next advertisement signal exactly as in steps S102 and S103.

As described above, the error obtaining unit 163 of the processor 160 of the central device 100 calculates the clock error in accordance with the transmission count information. Therefore, storing the calculated clock error and the transmission count information in the ROM 120 and using that data as historical data makes it possible to achieve additional functionality. Next, an example of such additional functionality will be described.

Figure 7A:
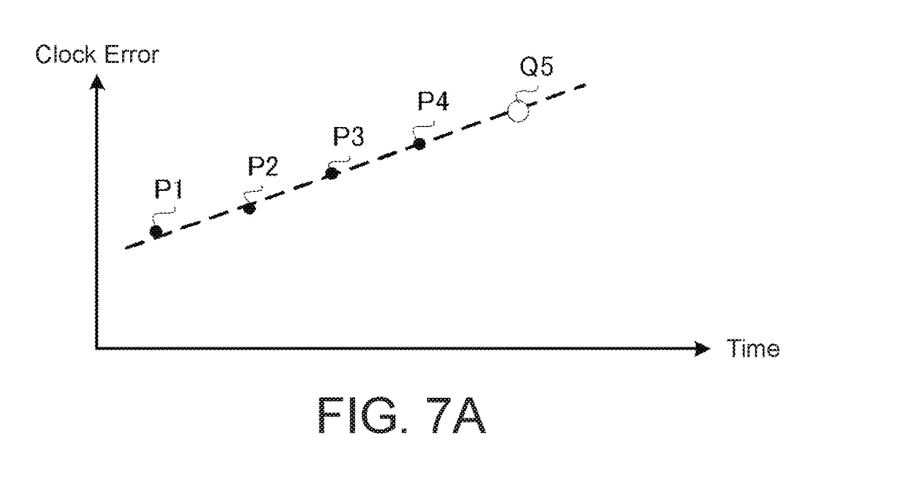
FIG. 7A shows a trending analysis.
Figure 7B:
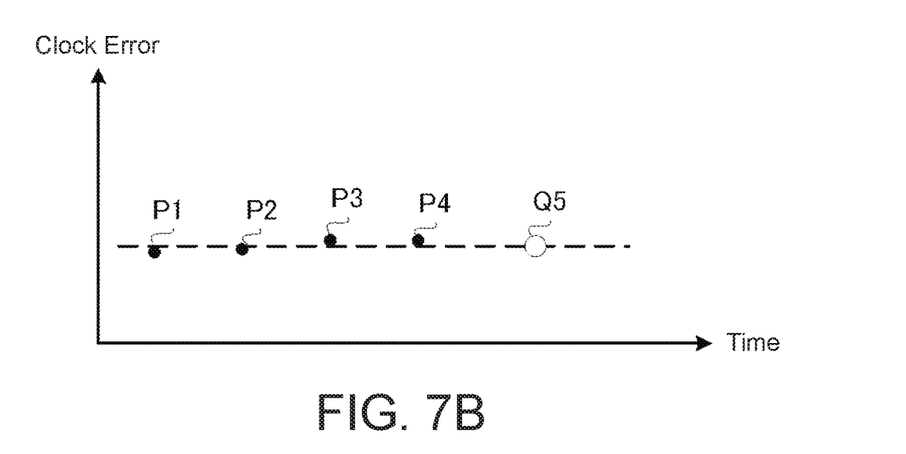
FIG. 7B shows an averaging analysis.

FIGS. 7A and 7B conceptually illustrate examples of cumulatively evaluating clock error. FIG. 7A shows a trending analysis, and FIG. 7B shows an averaging analysis. In the graphs shown in FIGS. 7A and 7B, the horizontal axis is time, and the vertical axis is the magnitude of the clock error. The points P1 to P4 are actual clock error values calculated previously, and the point Q5 is a predicted value for the next clock error.

In FIG. 7A, when the changes in the clock error are observed over a short period of time (for example, if P1 and P2 are compared, or if P2 and P3 are compared), it is apparent that the clock error is increasing. In this case, the next clock error can be predicted appropriately by applying a trending analysis. As shown by the dashed line in FIG. 7A, in the trending analysis, the predicted value Q5 for the next clock error is calculated in accordance with the slope of the increase in the clock error between the points P1 to P4.

Meanwhile, in FIG. 7B, when the changes in the clock error are observed over a short period of time (for example, if P1 and P2 are compared, or if P2 and P3 are compared), it is apparent that there are no significant changes in the clock error. In this case, the next clock error can be predicted appropriately by applying an averaging analysis. As shown by the dashed line in FIG. 7B, in the averaging analysis, the predicted value Q5 for the next clock error is calculated in accordance with the average value of the points P1 to P4.

Predicting the clock error as described above makes it possible to control the timing at which to activate the communication module in order to receive the next advertisement signal with improved precision. This additional functionality can be implemented using the error obtaining unit 163 and the timing controller 164 of the processor 160 in conjunction with the ROM 120, for example.

In the embodiment as described above, the central device 100 receives a plurality of advertisements sent from the peripheral device 200 at a fixed interval of Tx and calculates the clock error in accordance with that fixed interval Tx and the transmission count information contained in those advertisements. Furthermore, the central device 100 controls the timing at which to activate the communication module in order to receive the next advertisement signal in accordance with that clock error. In other words, the central device 100 calculates the clock error as the advertisements are received and controls the timing at which to activate the communication module in order to receive the next advertisement signal accordingly.

This makes it possible to control the timing at which to activate the communication module in order to receive the next advertisement signal with better precision than when calculating the clock error only when an advertisement is sent or received and controlling the receive time using that clock error. This also makes it possible to control the receive time using a predicted value for the clock error at any time as well as to control the receive time at any time in accordance with the trend in the clock error, for example. This is particularly advantageous not only because the time error (phase error) in the clock signals can be removed but also because the speed error (frequency error) in the clock signals which tends to increase proportional to time can be removed.

Moreover, as the plurality of advertisements sent at fixed intervals are received and the receive time is controlled accordingly, eventually an advertisement that contains idle period information is received. In this way, the timing to activate the communication module in order to receive the next advertisement signal is sufficiently regulated before the devices enter the idle period, thereby making it possible to reduce the clock error during the idle period. This also removes speed error (errors in clock speed) in the clock signals, thereby making the clock error less prone to increasing as time continues to elapse.

Furthermore, in the embodiment described above, the central device 100 controls the timing at which to activate the communication module in order to receive the next advertisement signal according not only to the clock error calculated using the transmission count information and the fixed interval but also in accordance with the clock error calculated using the idle period information. Controlling the receive time in this way makes it possible to remove clock error during the idle period as well.

This, in turn, makes it possible to keep the communication timing synchronized even after a long idle period. As a result, the periods of time during which the central device 100 and the peripheral device 200 must be actively operating can be reduced, thereby making it possible to reduce power consumption.

Therefore, the embodiment as described above makes it possible to synchronize the communication timing of the central device 100 and the peripheral device 200 while reducing inefficient power consumption in both the central device 100 and the peripheral device 200.

Moreover, in the embodiment described above, the peripheral device 200 sends advertisements that contain connection request flags to the central device 100. This makes it possible for the central device 100 to send connection requests in accordance with requests from the peripheral device 200 as well.

The description of the above embodiment concludes here. Note, however, that the embodiment described above is only an example, and the specific configurations, processes, and the like utilized in the central device 100 and the peripheral device 200 are not limited to those described above.

Modification Examples

In the embodiment described above, the timing controller 164 of the processor 160 of the central device 100 controls the timing at which to activate the communication module in order to receive the next advertisement signal by using the number of pulses on the clock when a previous advertisement was received as a reference and then adding the number of pulses corresponding to the fixed interval Tx, the idle period T1, or the like. This makes it possible to omit operations in which the central device 100 and the peripheral device 200 convert those numbers of pulses to time information.

However, the present invention is not limited to pulse-based control schemes, and the timing at which to activate the communication module in order to receive the next advertisement signal may also be controlled based on time information. For example, in the embodiment described above, the timing controller 164 of the processor 160 of the central device 100 may control the timing at which the next advertisement should be received by using the time (such as 3:01:05) at which a previous advertisement was received as a reference and then directly adding the fixed interval Tx (such as 10 seconds) or the idle period T1 (such as 3 minutes) thereto to obtain the time information for the next advertisement (such as 3:01:15 or 3:04:05, for example).

Unlike in the pulse-based scheme in which two clock signals that both contain error are compared to calculate a relative error, in this time information-based scheme the absolute error between the clock signals can be calculated, thereby making it possible to improve the precision when calculating the clock error.

Moreover, the fixed interval Tx is a fixed value. Therefore, if the transmission count information contained in an advertisement indicates that that advertisement is the fourth advertisement and the sending intervals for the first to fourth advertisements are all equal to the fixed interval Tx, for example, 3Tx (that is, the fixed interval Tx times three times the difference in transmission count information between the current (fourth) advertisement and the first advertisement) may be added to the number of pulses or the time information on the clock when the first advertisement was received in order to control the timing at which to activate the communication module in order to receive the next advertisement signal.

Therefore, in the present invention a wide variety of methods may be implemented to calculate the clock error. In the embodiment described above, an example of using the timings at which two advertisements were received in order to calculate the clock error was described. However, the clock error may also be calculated by using the timings at which three or more advertisements are received.

For example, if three or more advertisements are received at fixed intervals, the clock error may be calculated as the average value of the clock errors or from the trend in clock error. This makes it possible to control the timing and remove the clock error with high precision before entering the idle period, thereby making it possible to reduce clock error that arises during the idle period even if the upcoming idle period will be particularly long.

In the embodiment described above, the advertisements are sent and received over a single channel. However, the present invention may also be applied to cases in which advertisements are sent and received over a plurality of channels.

For example, the advertisements may be sent and received over three channels: a channel 37, a channel 38, and a channel 39. In this case, on channel 37 the number of pulses or time information may be controlled as in the embodiment described above, on channel 38 a channel interval C (a number of pulses or a time) may be added, and on channel 39 two times the channel interval C may be added and used as references or to control the receive time at which to activate the communication module in order to receive the next advertisement signal, for example.

In the embodiment described above, the central device 100 calculates the clock error as advertisements are received and controls the timing at which to activate the communication module in order to receive the next advertisement signal accordingly. However, the peripheral device 200 may calculate the clock error as some information that takes the place of advertisements is received, and the timing at which to activate the communication module in order to receive the next advertisement signal may be controlled accordingly.

The embodiment described above includes a single central device 100 and a single peripheral device 200. However, a plurality of peripheral devices 200 may be included. In this case, the central device 100 may identify which peripheral device an advertisement was sent from on the basis of address information or the like included in the advertisements sent by each peripheral device 200.

In the embodiment above, an example in which the central device 100 and the peripheral device 200 are wireless communication devices that communicate wirelessly using BLE was described. However, the present invention is not limited to wireless communication devices that communicate wirelessly using BLE. For example, the present invention may be applied to wireless communication devices or the like that communicate wirelessly using technologies such as Wi-Fi (registered trademark), standard Bluetooth (registered trademark), or ZigBee (registered trademark).

Furthermore, the central device 100 and the peripheral device 200 of the present invention are not limited to the devices described above, and the functionality of the central device 100 and the peripheral device 200 may be implemented by computers running programs, for example. These programs for implementing the functionality of the central device 100 and the peripheral device 200 may be stored on computer-readable storage media such as Universal Serial Bus (USB) memory devices, Compact Disc-Read Only Memory (CD-ROMs), Digital Versatile Discs (DVDs), or hard disk drives (HDD) or downloaded to the computers over a network.

A preferred embodiment of the present invention was described above. However, the present invention is not limited to the embodiment described above. The present invention includes all inventions included in the scope of the claims as well as their equivalents.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A wireless communication device, comprising:
   a wireless communication module configured to receive a plurality of notification signals that are successively transmitted from another wireless communication device; and
   a processor that is connected to the wireless communication module, the processor calculating a clock error between a clock in the wireless communication device and a clock in said another wireless communication device based on one or more of the notification signals that are received, and determining a timing at which to make the wireless communication module ready to receive a next notification signal from said another wireless communication device in accordance with the calculated clock error and a time interval at which the next notification signal will be transmitted from said another wireless communication device, said time interval being a predetermined fixed time interval or contained in the notification signal that has been received immediately prior to said next notification signal.

2. The wireless communication device according to claim 1, wherein the processor calculates the clock error in accordance with a time interval at which the notification signals are actually received by the wireless communication module and transmission count information that is included in the notification signals and that indicates a number of each of such notification signals according to order sent.

3. The wireless communication device according to claim 1, wherein the processor calculates the clock error in accordance with a time interval at which the notification signals are actually received by the wireless communication module and time information that is included in each of such notification signals and that indicates transmission time of each of such notification signals.

4. The wireless communication device according to claim 1,
   wherein at least one of the notification signals include idle period information that indicates a time interval at which a next notification signal will be sent from said another wireless communication device, and
   wherein when the wireless communication module receives the notification signal that includes the idle period information, the processor calculates the clock error in accordance with the idle period information and actual time at which the wireless communication module receives said next notification signal.

5. The wireless communication device according to claim 2,
   wherein at least one of the notification signals include idle period information that indicates a time interval at which a next notification signal will be sent from said another wireless communication device, and wherein when the wireless communication module receives the notification signal that includes the idle period information, the processor calculates and updates the clock error in accordance with the idle period information and actual time at which the wireless communication module receives said next notification signal.

6. The wireless communication device according to claim 3, wherein at least one of the notification signals include idle period information that indicates a time interval at which a next notification signal will be sent from said another wireless communication device, and wherein when the wireless communication module receives the notification signal that includes the idle period information, the processor calculates and updates the clock error in accordance with the idle period information and actual time at which the wireless communication module receives said next notification signal.

7. The wireless communication device according to claim 1, wherein the notification signals each include a connection request flag indicating whether a connection is requested, and the processor generates a connection request signal for establishing a connection with said another wireless communication device in accordance with said connection request flag.

8. The wireless communication device according to claim 2, wherein the notification signals each include a connection request flag indicating whether a connection is requested, and the processor generates a connection request signal for establishing a connection with said another wireless communication device in accordance with said connection request flag.

9. The wireless communication device according to claim 3, wherein the notification signals each include a connection request flag indicating whether a connection is requested, and the processor generates a connection request signal for establishing a connection with said another wireless communication device in accordance with said connection request flag.

10. The wireless communication device according to claim 4, wherein the notification signals each include a connection request flag indicating whether a connection is requested, and the processor generates a connection request signal for establishing a connection with said another wireless communication device in accordance with said connection request flag.

11. The wireless communication device according to claim 5, wherein the notification signals each include a connection request flag indicating whether a connection is requested, and the processor generates a connection request signal for establishing a connection with said another wireless communication device in accordance with said connection request flag.

12. The wireless communication device according to claim 6, wherein the notification signals each include a connection request flag indicating whether a connection is requested, and the processor generates a connection request signal for establishing a connection with said another wireless communication device in accordance with said connection request flag.

13. A wireless communication method for execution at a wireless communication device, comprising:

receiving, via a wireless communication module included in the wireless communication device, a plurality of notification signals that are successively transmitted from another wireless communication device;

calculating, by a processor included in the wireless communication device, a clock error between a clock in the wireless communication device and a clock in said another wireless communication device based on one or more of the notification signals that are received; and determining, by said processor, a timing at which to make the wireless communication module ready to receive a next notification signal from said another wireless communication device in accordance with the calculated clock error and a time interval at which the next notification signal will be transmitted from said another wireless communication device, said time interval being a predetermined fixed time interval or contained in the notification signal that has been received immediately prior to said next notification signal.

14. A non-transitory storage medium having stored therein instructions that cause a processor included in a wireless communication device to perform the following:

causing a wireless communication module included in the wireless communication device to receive a plurality of notification signals that are successively transmitted from another wireless communication device;

calculating a clock error between a clock in the wireless communication device and a clock in said another wireless communication device based on one or more of the notification signals that are received; and determining a timing at which to make the wireless communication module ready to receive a next notification signal from said another wireless communication device in accordance with the calculated clock error and a time interval at which the next notification signal will be transmitted from said another wireless communication device, said time interval being a predetermined fixed time interval or contained in the notification signal that has been received immediately prior to said next notification signal.

* * * * *